United States Patent [19]

Fox

[11] 4,141,069

[45] Feb. 20, 1979

[54] TIME DEPENDENT POWER DEMAND CONTROL METHOD

[75] Inventor: Richard Q. Fox, Orlando, Fla.

[73] Assignee: Westinghouse Electric Corp., Pittsburgh, Pa.

[21] Appl. No.: 828,056

[22] Filed: Aug. 26, 1977

[51] Int. Cl.² .......................... G06F 15/56; H02J 3/14
[52] U.S. Cl. ...................................... 364/493; 307/52
[58] Field of Search .................. 364/492, 493; 307/35, 307/39, 41, 52, 62; 324/103

[56] References Cited

U.S. PATENT DOCUMENTS

| | | | |
|---|---|---|---|
| 3,296,452 | 1/1967 | Williams | 235/151.21 |
| 3,522,421 | 8/1970 | Miller | 235/151.21 |
| 3,652,838 | 3/1972 | Dillon et al. | 235/151.21 X |
| 3,659,114 | 4/1972 | Polenz et al. | 235/151.21 X |
| 3,697,768 | 10/1972 | Johnston | 235/151.21 X |
| 3,862,430 | 1/1975 | Lenhart et al. | 307/62 X |
| 3,872,286 | 3/1975 | Putman | 235/151.21 |
| 3,987,308 | 10/1976 | Burch | 307/52 X |
| 4,023,043 | 5/1977 | Stevenson | 235/151.21 X |
| 4,034,233 | 7/1977 | Leyde | 235/151.21 X |

*Primary Examiner*—Edward J. Wise
*Attorney, Agent, or Firm*—C. M. Lorin

[57] ABSTRACT

A power demand control method uses a temporary demand limit in excess of the demand limit assigned as a target at the end of the demand period, and such temporary demand limit is reduced by steps from control point to control point until it coincides with the assigned target at the very end of the demand period. More specifically, the demand limit used for prediction is reduced by a major portion always the same from predicted demand error to the reset, thereby progressively reducing the same down to zero at the end of the period.

1 Claim, 19 Drawing Figures

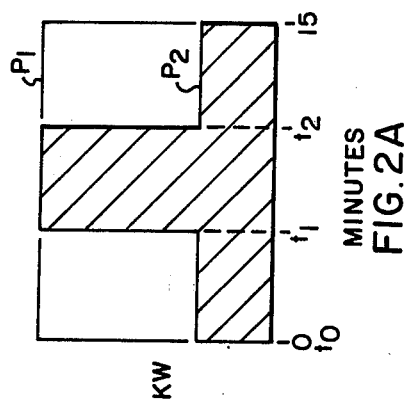
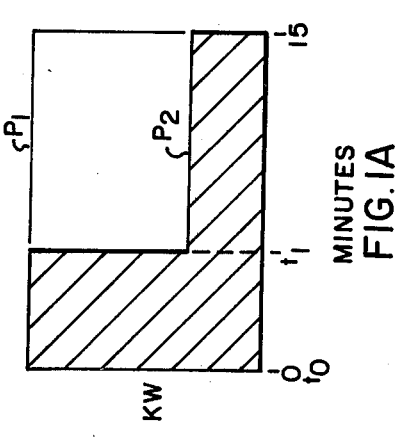
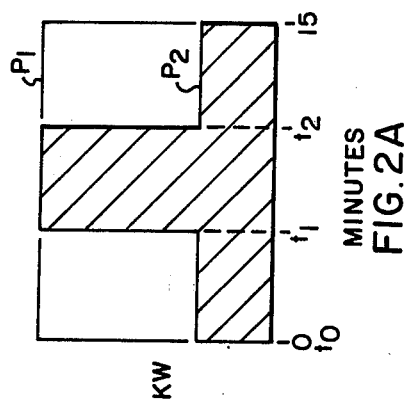
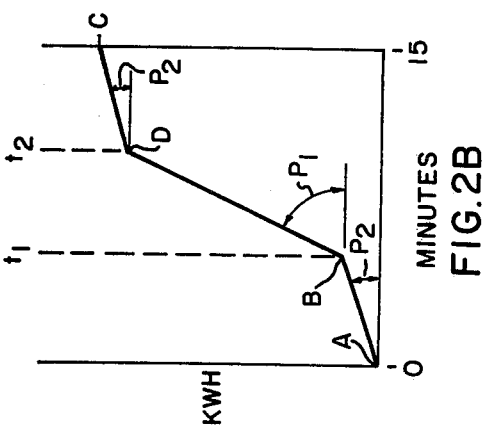
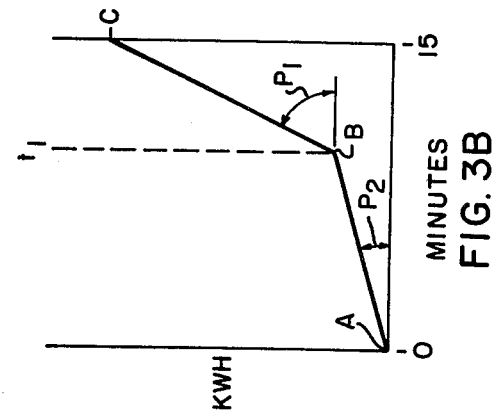
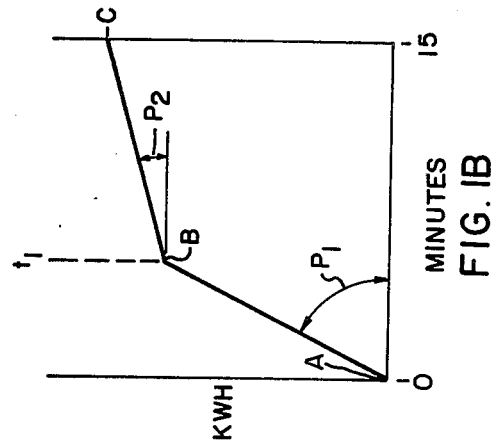

TIME DEPENDENT POWER DEMAND CONTROL METHOD

BACKGROUND OF THE INVENTION

The invention relates to a power demand control method of switching loads by prediction in a plant facility supplied by energy from a utility company in order to keep the demand at the end of a period of control within a demand limit assigned at the beginning of the period.

The prior art of power demand control has been described and the technique used has been disclosed in U.S. Pat. No. 3,872,286 of Putman, issued on Mar. 18, 1975. For the purpose of the description hereinafter of the present invention, the description and drawings of the Putman patent are hereby incorporated by reference. The prior art has shown that it is desirable to switch loads as early as possible in the demand period in order to have a maximum degree of freedom for control with the available loads, while being able to meet the target at the end of the period. For instance, in the Putman patent, during the first minutes of the period, the control system is allowed not to de-energize any load, thus letting the installation and equipment of the plant follow its needs without any constraint from the controller. This is a way of maximizing the use of the available energy, without forgoing the possibility of a heavy control later in the period in order to still meet the demand limit. This method, however, being the all or nothing approach, may run the risk that effective control at a later time is no longer possible. Moreover, the loads liberated in the first period because of the absence of control might not be the most judicious ones.

In contrast, the present invention proposes to maximize the utilization of the energy within the assigned demand limit without giving up control at any time during the period.

An object of the present invention is to control the loads in a plant facility in order to maximize the use of the loads within an assigned demand limit.

Another object of the present invention is to control the loads during a period of control by prediction of a final demand at the edn of the period, an instantaneous demand being controllably achieved at selected operative points during the period.

A further object of the present invention is to integrate the consumption of energy by selective switching of the loads in a plant facility along a predetermined integration curve intersecting a desired target at the end of the period.

Still another object of the present invention is to meet at the end of a period of control limit assigned to the demand of energy called by the loads in a plant facility through successive approximations performed along a monotonic curve as a result of control of the loads during the demand period. Achieving such maximization by the control method according to the invention stems from a maximum permissible limit achieved at each operative point during the demand period with the maximum permissible limit being varied as a function of time during control.

Therefore, a further object of the present invention is to maximize (by power demand control) the amount of energy consumed during a period of control of the loads in a plant facility while staying within a demand limit assigned at the beginning of the demand period, the control method imposing a limiting control condition at each operative point during the demand period.

SUMMARY OF THE INVENTION

The invention resides in a control system for holding to a predetermined final demand limit at the end of a demand period the power demand of an industrial plant having a plurality of interruptible loads;

means operative from the beginning of the demand period in relation to successive time intervals within the demand period for establishing respective pseudo-demand-limits at the end of the demand period;

means for providing an indication of power consumption of said loads during the demand period;

means responsive to said indication means for predicting a demand at the end of the demand period;

means responsive to said predicting means and operative during said successive time intervals in relation to corresponding pseudo-demand-limits for providing a demand error relative to said corresponding pseudo-demand-limit;

means for selecting a suitable amount of power with said loads to minimize said demand error within the corresponding time interval;

said "predicting means" responsive means being operative after the last of said time intervals for providing a residual demand error relative to said final demand limit and said selecting means being operative to minimize said residual error before the end of the demand period.

BRIEF DESCRIPTION OF THE DRAWINGS

The invention will now be described in the context of the supply of electrical energy by a utility power supply company to an industrial plant, and reference shall be made to the accompanying drawings in which:

FIGS. 1A, 1B, 2A, 2B, 3A and 3B show curves representing the correlation between KW and KWH consumed during a demand period for three different time distributions of power consumption for the same total of KWH.

DESCRIPTION OF THE INVENTION

Power demand control systems play a prominent part in plant energy management. The recent rise in electricity and fuel prices has focussed the attention on control of the loads in order to improve return-on-investment for a wide variety of plants.

Power demand meters integrate power with respect to time (i.e., KwH) over a fixed time period typically of 15, 30 or 60 minutes duration. The meter reading is stated in mean kilowatts over the period, and is, therefore, in effect KwH/hour. FIGS. 1A, 1B, 2A, 2B, 3A, 3B show sample cases of power levels with corresponding demand period diagrams. The slope of the KwH/h curve is here linearly proportional to the power at any point in time.

Figure 4:
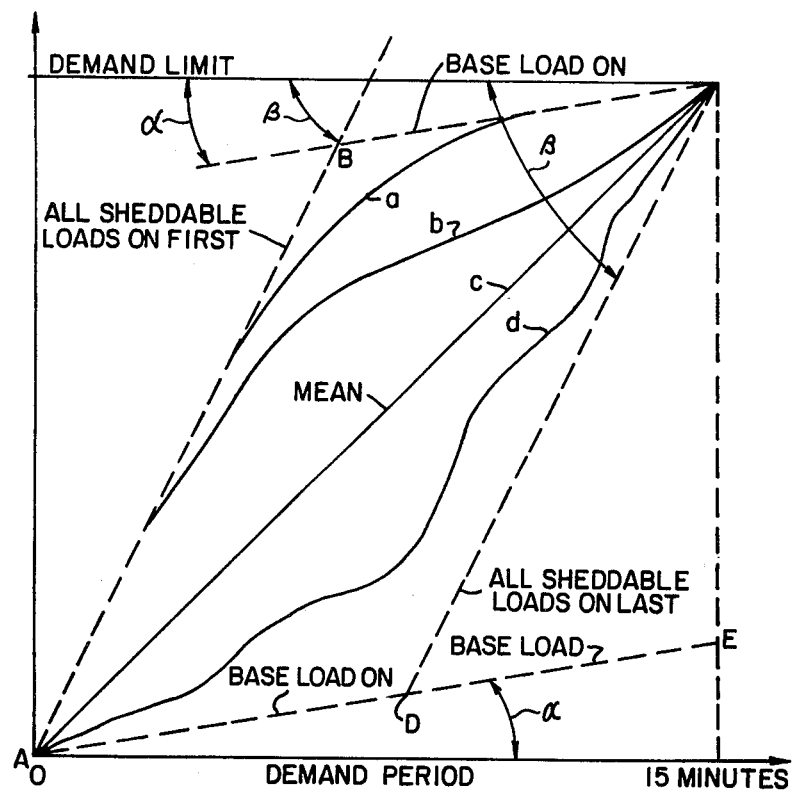
FIG. 4 represents the extensive and intermediary KWH/TIME trajectories toward a total value of the KWH established as a limit not to be exceeded when controlling the consumption by shedding or adding loads against a base of unsheddable loads.

In FIG. 4 is shown the situation for a plant with an uncontrolled base load (lights, machine tools, etc.) and only one switchable load. The diagonal line OC to the intersection of the demand limit on the 15 minutes ordinate is called the Ideal Curve, but it is mainly from the point of the power company. Nevertheless, power levels with slopes greater than the slope of the "ideal curve" are acceptable so long as during the remainder of the period there exist compensating power levels with slopes which are less than the slope of the ideal curve.

If only a base load exists, the demand curve follows the line AE. Should the single sheddable load be switched on at the beginning of the period, curve ON will be followed. Line BC is parallel to AE and it will be obvious that the sheddable load must be switched off at the intersection of AB and BC if the demand limit at C is not to be exceeded. Similarly, should the sheddable load not be switched on until towards the end of the period, the best time to switch is at the intersection of AE and CD. However, it can be shown that any continuous or discontinuous path between A and C which lies within the envelope OXDY (not shown on FIG. 4) is equally valid if the only object is from a cost point of view not to exceed the demand limit at C. The *best* path must, therefore, be established from other criteria.

A satisfactory power demand control system should not only maintain the demand at the end of any period below a preset limit; it should also attempt to perform this function with minimum disruption to the plant or process. Demand controllers by their very nature tend to reduce energy consumption. As already indicated, demand limit may be expressed as KwH consumed divided by the length of the period in hours. Thus lowering the demand limit will automatically reduce the amount of energy consumed, particularly during peak demand periods.

However, the equipment in the plant which it is proposed to shed in order to control demand was originally installed with some purposes in mind which have to be respected. For this reason it is normally good operating practice to switch the loads in such a way that the demand meter reading at the end of any period is as close as possible to a preset limit defined in accordance with production requirements. This is commonly expressed as maximizing the load factor; load factor being defined as the ratio: demand meter reading at the end of a period divided by demand limit. Maximizing load factor amounts to minimizing plant disruptions.

Since sheddable loads have value to the plant and the industrial process therein, normally it is not acceptable for a control system to shut the loads down and not to be able to bring them back on again. Were this possible, demand control would not be an issue, since all sheddable loads could be shut off immediately as soon as the demand limit were reached and left off until a new period began. Such a control strategy is unacceptable for most plants. Each load must be assigned a maximum off time and a minimum on time, and, a specific ON/OFF time ratio. Under the concept of maximum OFF time as a major constraint for the loads, the natural tendency of the control system will be towards switching equipment OFF, thus establishing a resilient tendency against control action by switching ON the loads. The ON/OFF ratio is also a constraint which has to be satisfied before a new shutdown of the particular unit becomes possible, since such unit becomes available for switching OFF sooner, if its previous OFF time has been less than the assigned maximum. Another type of constraint ensures that the interval between two successive starts of an item of equipment is greater than a desired minimum so as to reduce wear on the motor and starter.

Demand control systems are quite different from analog type process control systems in several significant ways. Normally only a part of the total electrical load is under control so that the real base from which the system is working is uncertain so far as the remainder of the period is concerned. The randomness of the minimum consumption constraint combinations produces another uncertainty concerning the estimated consumption from now to the end of the period from this cause. The discontinuous nature of the feedback data and its variable time interval of receipt (due to this data normally consisting of a train of pulses from one or more kilowatt hour meters) adds an additional dimension to the problem. Finally, a set of switchable equipment which includes both large and small loads of varying importance which moreover may be only of occasional use, calls for further requirements.

In the U.S. Pat. No. 3,872,286 of Putman, a strategy of control termed "predictive" has been described by which the control system attempts to forecast the anticipated results in power consumption at the end of that period. In the forecasting technique, power is being either measured directly or estimated from the time interval between two consecutive KwH meter pulses since:

Power = (KwH/pulse)/(time between two pulses in hours)

It should be noted that, for a given error in demand limit, less load needs to be switched at the beginning of a period to reduce the error than at the end of a period.

When loads can be dropped arbitrarily to maintain a limit, the problem can frequently be solved by one of the strategies already referred to.

The control system may also use, but not necessarily, the strategy termed *constrained*. In this case, as explained earlier and described in the Putman patent, each load is assigned a maximum off time during a given elapsed time, this off time being rotated sequentially among a group of equipment. However, where a group of quite unrelated loads are involved, each with different needs, a maximum off time for each unit should be assigned together with either a minimum absolute on time or a minimum on time which is a function of the previous off time. Superimposed on this may be a minimum interval between successive starts. An alternative concept often used with large loads is the assigning of a maximum on time during any one period; by contrast, the time integration used for the constraint in the previous approaches can carry forward from one period to another. It is this latter feature which largely accounts for the different sequences of switching between one period and another, a desirable phenomenon in order to minimize wear.

The control system may also use the priority concept. This system as explained in the Putman patent, allows preferential load shedding for those units with a smaller detrmiental effect on the profitability of the plant. Where a group of equipment is assigned the same priority, the concept of subpriorities which can be rotated among the group again allows wear to be spread. Systems should be designed so that priorities do not need to be assigned in a consecutively numbered sequence and the use of "dollars lost per minute" as a definition of shedding priority can be helpful.

All of these strategies may be incorporated within a single control system.

Any number of KwH meters can be handled by a control system. The data can be grouped together for purpose of control, management, cost, or other purposes. The input data is numerically filtered to minimize the effect of transient conditions.

Control is exercised on receipt of pulses from the main demand control KwH meters; but to avoid excessive switching, the minimum interval between control iterations preferably is in the order of 20 secs. Longer intervals can be allowed when the system is consuming energy at a rate less than the demand limit.

The control strategies selected are each exercised in turn and in a prescribed order, which may differ from plant to plant. All loads within the plant are assigned to one of six categories:

(a) Inhibited loads which have a maximum ON time and a specified point in the period before which they are prevented from being switched ON. Loads of this type are customarily allowed ON during the first 30 secs. of a period and are allowed to remain ON for only 30% to 50% of the period.

(b) Sheddable loads for which a maximum OFF time is specified together with an ON/OFF ratio and a priority. These may be further subdivided into:
  (i) Critical loads for which the actual status needs to be known with certainty, rather than implied from the status of the output contact controlling it.
  (ii) Sheddable loads which are unloaded by direct electrical switching.
  (iii) Sheddable loads which are unloaded mechanically, e.g., by closing a damper or lifting the inlet valve of a compressor.
  (iv) Sheddable loads assigned a group priority with rotating subpriorities.

(c) The base load which includes all other and uncontrolled loads within the plant.

The control technique described in the Putman patent takes into account several options in handling the loads from the beginning of a demand period before the period has expired and as long as some control of the loads remains available. In particular, the Putman patent expressly teaches that it is desirable to switch loads in the beginning of the period since the degree of freedom is much reduced, if the demand limit is to be met, toward the end of the period. By allowing more loads to be switched in the beginning than at the end of the period, the demand curve (see FIG. 4) will be one above the ideal curve OC. By maximizing the concavity of the demand curve, it is possible to more fully use in the plant the energy available within the assigned demand limit.

One way of maximizing the concavity of the demand curve as proposed by Putman in the afore-mentioned U.S. Pat. No. 3,872,286, consists in holding the systems without any form of control during the first part of the demand period, for say, five minutes. Control resumes in Putman for a second field of control with a bias exerted on the target. As a result of such bias, the rigidity of the system is increased, and during the third and last field of control, the rigidity is progressively reduced until the target anticipated from the beginning of the period is achieved at the very end of the period.

Figure 6:
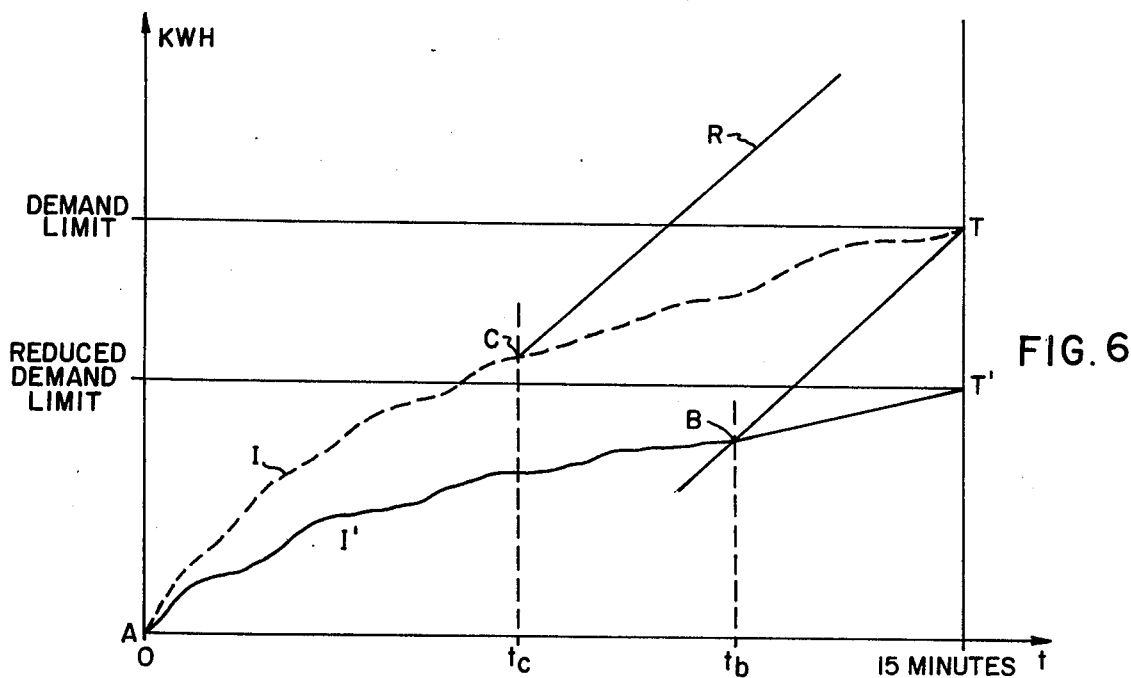
FIG. 6 illustrates a particular strategy of control by assigning a temporary demand limit during the period of control.

Thus, on the one hand, the Putman patent shows one way to increase the KwH consumed in the earlier part of the demand period by absence of control. On the other hand, the patent shows how to change the target, assigned as a demand limit, during the period in order to change the rigidity of control, and affect the selection of the loads. In the latter respect, the Putman patent also discloses the idea of using a reduced demand limit during a first portion of the demand period (see FIG. 6) so as to follow a demand curve I', rather than the intended demand curve I. At a time $t_b$ a specific load can be switched ON under the non-reduced demand limit (BT) to reach the target T and accomplish the desired profile of utilization of the overall loads.

The present invention provides a more systematic way of maximizing the utilization of the loads within a given demand limit. It also does not abandon maximization during any portion of the demand period. At all times during the period the control method chooses as a basis for decision the point in time during the period, then the proximity to the end of the period and the distance from the target.

FIG. 4 shows with AC one form of demand control, over a 15 minute demand period. Since this is a straight line, the rate of consumption of power is constant. However, this form of demand control is not necessarily the best.

Since some individual loads in the plant may be larger than the average rate of consumption allowed by the ideal curve AC, a demand control algorithm which results in a curve like (a) on FIG. 4 would be desirable. Curve (a) is a plot of KWH against time, and therefore the slope of the curve corresponds to the rate of consumption of power. Portions of the slope are steeper than any part of the ideal curve or AC line. Therefore, larger loads can be run, for short periods of time, along curve (a) than along line AC.

There are two limits to be respected in shaping curve (a). First, it must intersect the desired demand limit at the end of the demand period, and second, the minimum slope by definition should be no less than the rate of consumption of the power system with all switchable loads OFF, and all other loads ON. (BC on FIG. 4)

The invention, then, provides for automatic control along curves such as curve (a) and affords a method of implementing such curves in a demand controller. Since the demand controller attempts by controlling the rate of consumption to "aim" towards an interception with the desired demand limit at the end of the demand period, the easiest way to modify the shape of the curve is to manipulate the "desired demand limit" during each demand period. However, the value of the limit must finally equal the true "desired demand limit" at the end of each demand period, and the area under curve (a) must not exceed the area defined by ABC.

One equation which suitably manipulates the target value of the demand limit as just stated is one derived as follows:

Largest consumption to be allowed = some percentage of largest possible rate of consumption = some percentage of KW max.

Energy consumed in one full period of largest allowable rate of consumption = some percentage of KW max $$* \frac{\text{PERIOD LENGTH}}{60 \text{ minutes}} = \text{BIAS}.$$

Therefore:
Pseudo Demand Limit = some percentage of KW max $$* \frac{\text{PERIOD}}{60} * \frac{\text{PERIOD-T}}{\text{PERIOD}} + (KWH \text{ max}) =$$
$$\text{BIAS} * \frac{\text{PERIOD-T}}{\text{PERIOD}} + KWH \text{ max}.$$

Where:
KW max is the largest possible rate of consumption;
Period is the demand period in minutes;
T is the elapsed time in the period; and
KWH max is the true demand limit.

Figure 7:
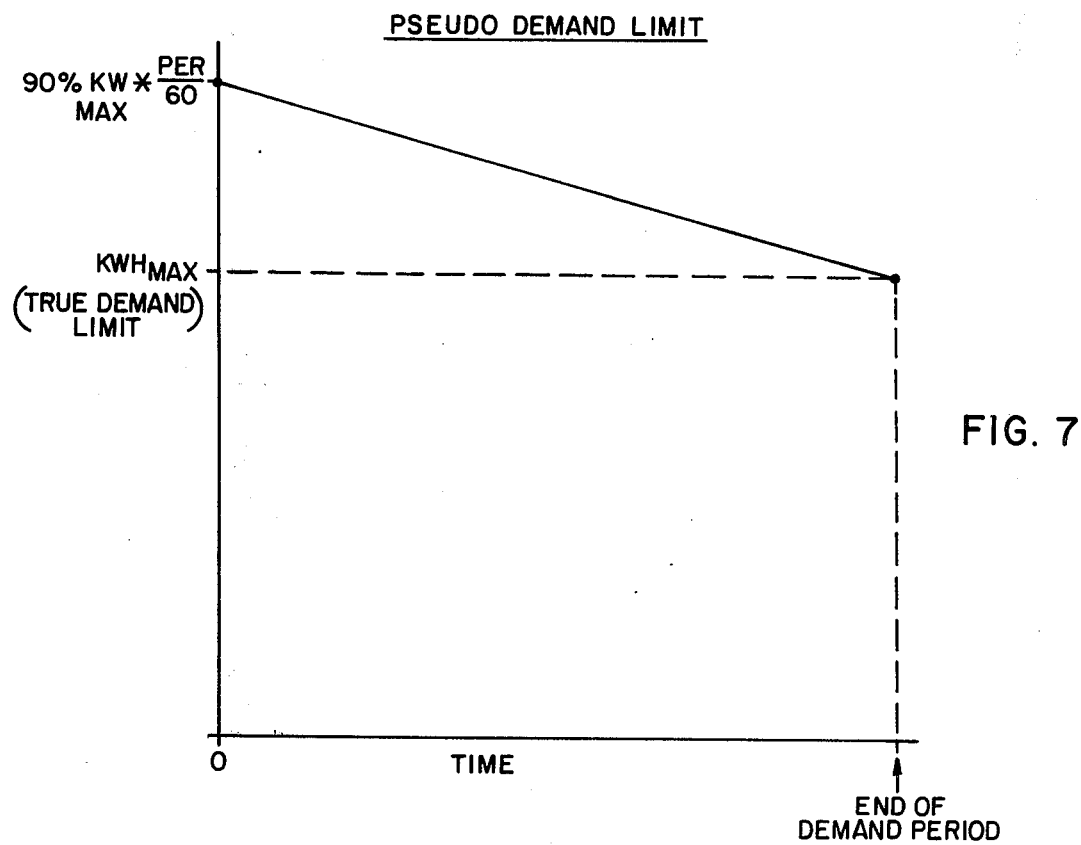
FIG. 7 shows graphically a succession of temporary demand limits typically used during control by the control system according to the invention.
Figure 8:
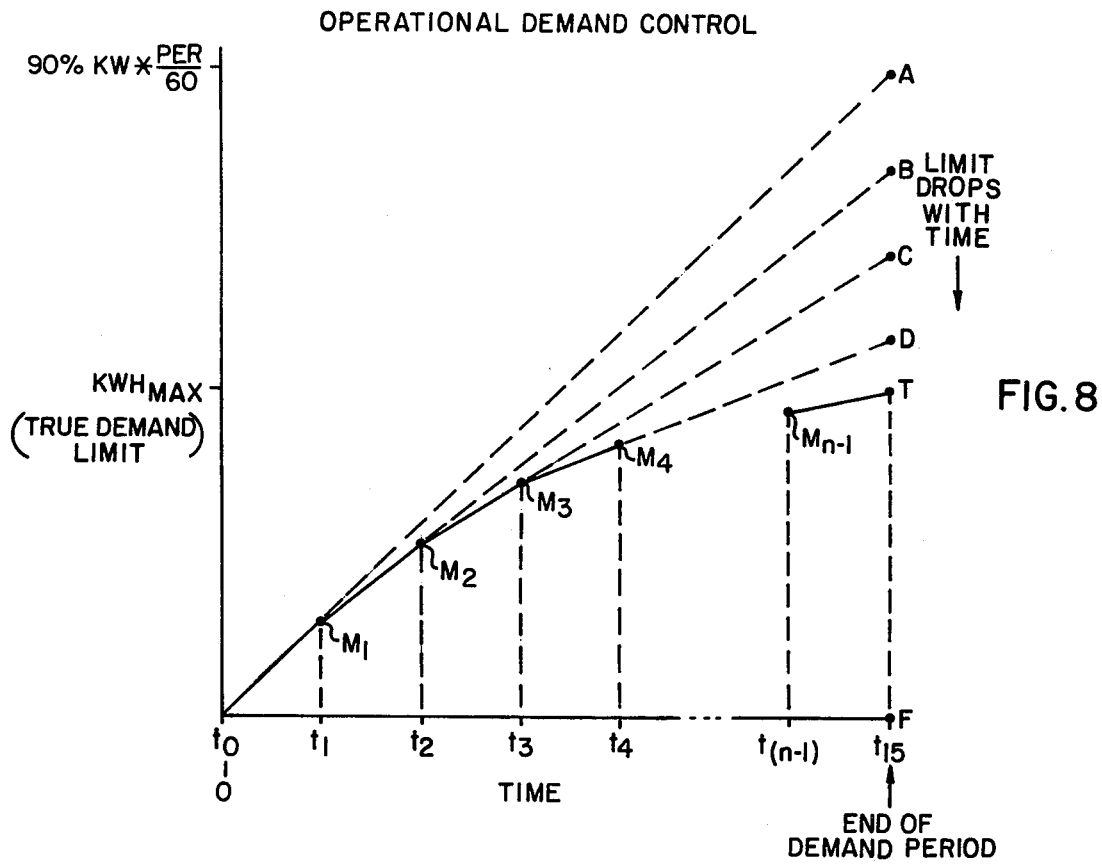
FIG. 8 shows the demand curve with the temporary demand limits used for prediction at the various control points during control by the control system according to the invention.

FIG. 7 illustrates by a curve how the above equation works. The demand limit starts high, and drops down to its true value by the end of the demand period. FIG. 8 illustrates how demand control according to the present invention chases the pseudo demand limit. Considering FIG. 8, successive time intervals $(t_0-t_1)$, $(t_1-t_2)$ ... $(t_{n-1}-t_{15})$ are shown as determined by a clock. For instance, each time interval has a 1 second duration. At time $t_0$, which is the start of the 15 minute demand period, a pseudo-demand limit is defined by line OA aimed at point A on the 15 minute ordinate, in excess by $\Delta T$ of the target T to be reached at the end of the period. The computer calculates a demand error on the basis of the power demand $P_o$ as known at the end of the preceding demand period. If no control were effected at time $t_o$ the demand would reach some point $P_o$ at the end of the period. The system effectuates control on the basis of the error $(P_o-A_p)$, where $A_p$ is the demand in KWH corresponding to ordinate A. Decisions are taken by the computer to shed, or switch, loads ON during time interval $(t_0-t_1)$ by reference to such assigned pseudo-target A, which in principle is reached at time $t_1$ with operative point $M_1$. The same process governs control by the system during the next time interval, namely $(t_1-t_2)$ towards operative point $M_2$. The pseudo-target during this period time interval is defined by B on the ordinate of the target T. At operative point $M_2$ reached with such pseudo-target B, a new pseudo-target C is assigned for time interval $(t_2-t_3)$ and so on, each pseudo-target A, B, C being in excess of the real target T by a reduced amount. From time $t_{(n=1)}$ to time $t_{15}$ the target becomes the real target T reached by the same demand error control technique. It will have been reached by successive approximations.

GENERAL DESCRIPTION OF THE INVENTION IN THE CONTENT OF THE STRUCTURAL AND OPERATIVE CHARACTERISTICS OF THE POWER DEMAND CONTROL SYSTEM OF U.S. PAT. NO. 3,872,286

For the sake of clarity and for the purpose of illustration only, operation of the control system according to the present invention will be described in the context of the power demand control system of U.S. Pat. No. 3,872,286.

Figure 9:
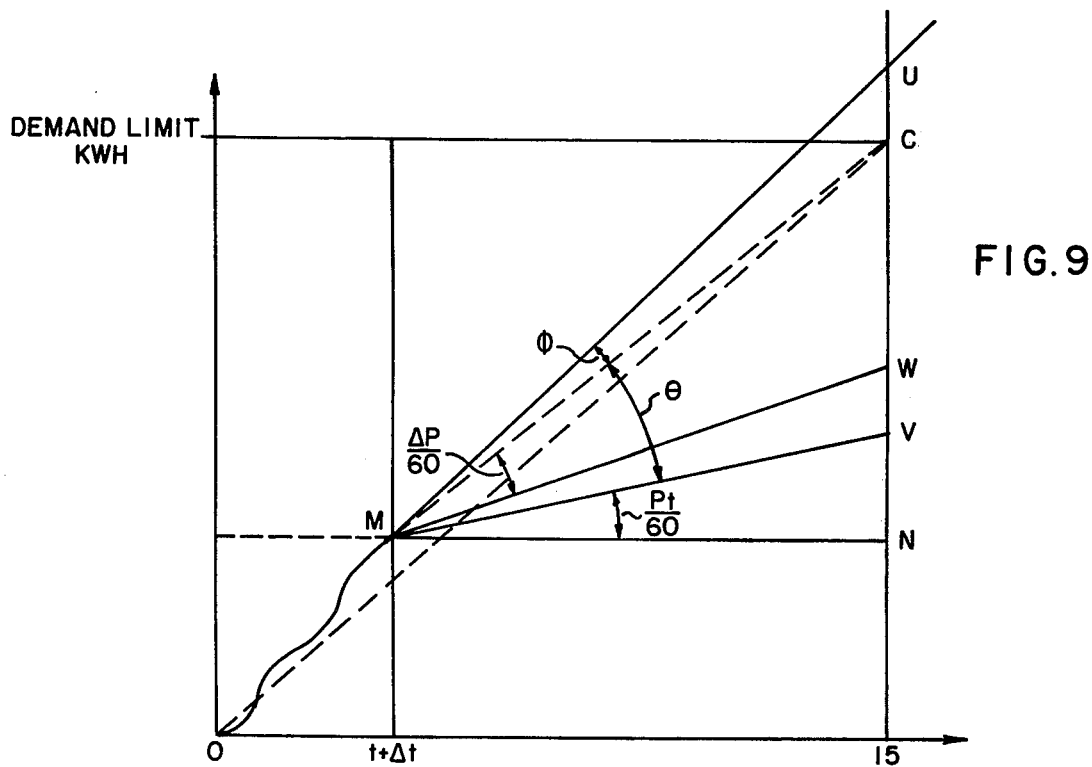
FIG. 9 illustrates diagrammatically the principle of calculation of the demand error used in the control system according to the invention.

FIG. 9 illustrates the principle of calculation of the error for any point M along the trajectory during a demand period of 15 minutes. A clock installed by the power supply company determines the initial time of each demand period, (or the final time of a preceding demand period). The watthour meter provides a "KHW pulse" which represents the magnitude of the power which has been consumed during a certain instant $\Delta t$ corresponding to a full rotation of the disc of the meter, thus representing a constant increment or unit of energy (KWH). Thus, the $\Delta t$ interval appearing along the time axis is essentially variable. This time interval is detected as a representation of the slope at point M and it represents the power $P_t$ in KW hour/hour. If the load of the plant is maintained in the same condition until the end of the 15 minute period, the energy curve will follow the tangent MW. However, the Demand Limit should be at C. Therefore there is an error CW by default, which in terms of power is:

$$\Delta P = \frac{(60) \times CN}{15-t} - P_t$$

as is evident from the geometry of triangles MNC and MWC. Having determined Slope = $\Delta P/60$ by triangulation, and the sign of the error, depending upon whether the intersection point W is above or below the target C, control is effected by selectively adding or shedding suitable loads in the plant. In order to more closely follow the target, a deadband may be provided on either side of the trajectory by defining two angles $\phi$ and $\theta$ which should not be exceeded. The deadband will contain excessive control but will leave free control of the loads as long as the projected tangent remains within two limits MU and MV (FIG. 9) so defined. Such deadband is made variable as will be explained later. The upper limit MU will represent the "decrease vector" and the lower limit MV of the deadband will represent the "increase vector" for control.

It will be hereinafter assumed that the power demand results from a plurality of loads which at least in part can only be switched ON or OFF under constraints existing either at all times or occurring at least at the instant of control. However, by ON and OFF, it is understood that the loads, if electrical, need not be switched by electrical connecting or disconnecting. A power consumption can be increased or decreased by mechanical connection or disconnection of the load as well, such as by means of a clutch or valve actuation.

When several loads are available for being switched ON or OFF, there is an ambiguity as the response that can be made for proper control; For example, at times a load switched OFF by the controller may already be OFF. The particular load to be switched ON by the controller might have been previously put out of service. It is also possible that control of the demand be prevented by an overriding and external control equipment associated with the load, as is usual with air conditioners, chillers, or air compressors, for instance. Other types of constraints can be found in the particular industrial plant of a customer to a power company, and are within the scope of application of the present invention.

A judicious selection is made of the loads in order to respect these constraints by eliminating from the priorities set among the loads those which are found to be in violation of the existing or anticipated constraints. Thus the priorities are not only determined by a predetermined classification of the loads, they are also changed in the course of the control process in order to take into account the history of the loads as it appears from a reappraisal of the availability to be switched ON or OFF, during the demand limit control process.

The selection of a load not only depends upon the overall status of the different loads, but also upon the behavior of any particular load in the user's plant. The control system method therefore provides for a dynamic allocation of priorities in the selection of the loads to be controlled at any particular time.

The method also provides for relative control, rather than an absolute control of the loads, any selected and controlled load charge being effected independently from the base load and from non-controlled loads.

The control method further takes into account the established constraints. For instance, besides interruptible loads which can be selected to be shed or to be added, there may be in the plant loads having a non-controllable status, which otherwise could defeat the control system. However, the control system may also limit its own capability of switching loads in order to accept the non-controllable loads as a favorable factor of correction when in the demand limit control mode, in particular by making use of a deadband.

The computer system in the demand limit control mode moreover calls for the determination of the constraints either off-line or on-line in order to be able to ascertain with improved accuracy the anticipated effect of control and prepare for the right decision in selecting the loads to be controlled at a given instant or for an emergency action by the present control operation. To this effect a special technique of simulation may be provided on the basis of actual load behavior in the user's plant, and such technique of simulation would be used either as an off-line information providing system to be used preparatory to running of the control system according to the invention, or as an on-line coordinated helper system for constantly revising predictions and updating data during control of the loads in real time.

Further, the control method provides, in the demand limit control mode, for shedding loads or adding loads to limit the total power demand as desired at the end of any given demand period with modifications in order to maximize the needs for particular loads of the user by minimizing the effect of control under the plant's constraints. The technique involves the use of a deadband, namely the use of vector limits within which no switching (on or off) of load is effected. In order to allow switching of larger loads when they are selected under the assigned priorities, the control system may be operated with a variable deadband. The technique used in U.S. Pat. No. 3,872,286 consists in using three fields of control during the demand period and a temporary target is assigned below the objective for control until a certain time limit relatively close to the end of the demand period. When such limit has been reached, the bias so established is progressively reduced to zero until the end of the demand period, at which time the demand limit is substantially achieved. In the latter respect, the control system according to the present invention will appear to differ from such prior art technique.

Figure 10:
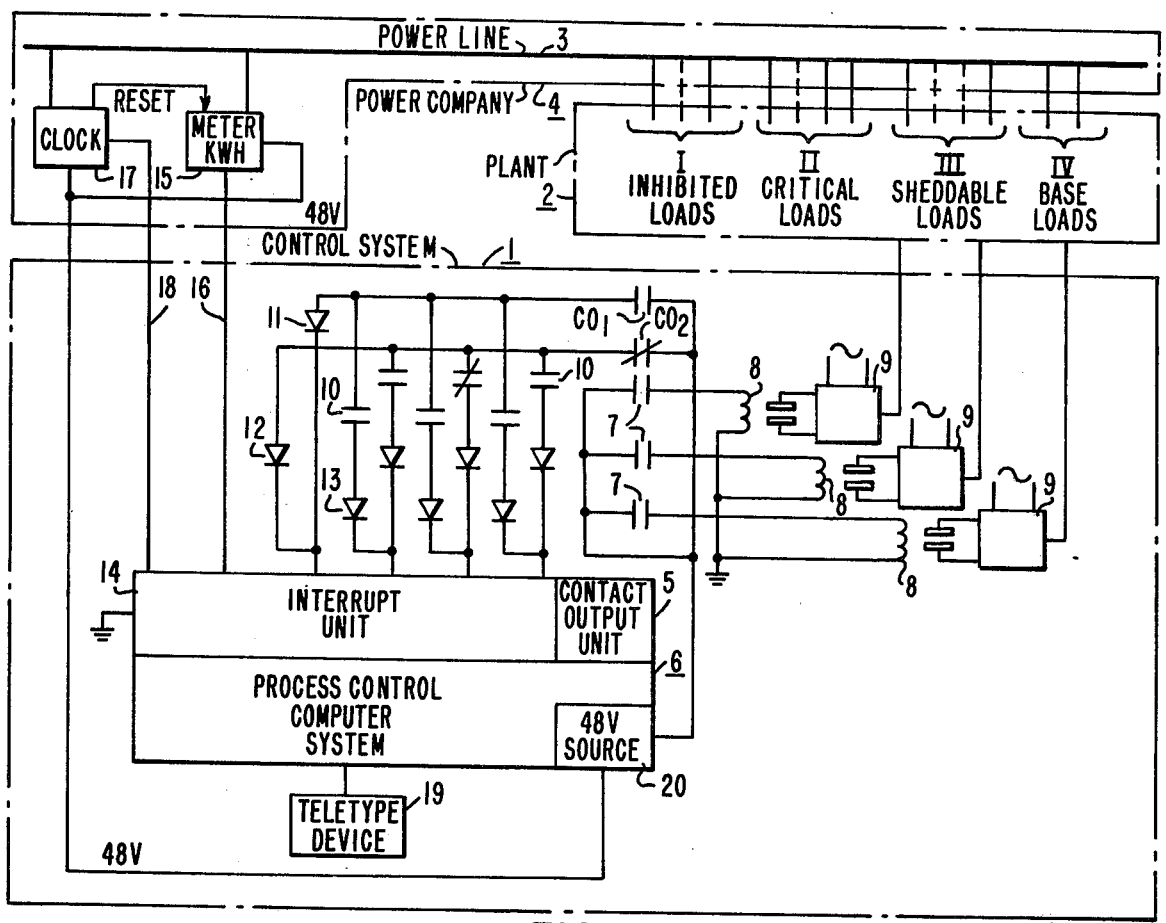
FIG. 10 is an overview of a computerized control system used for implementing the method according to the invention.

Referring to FIG. 10, there is shown an overview of a control system 1 which may be used to implement the method according to the present invention. The method is applied to control of the loads of a plant 2 supplied with electrical power on the power supply lines 3 of a power supply.

In the plant there is a base load represented by equipment which is constantly present or at least, if the equipment is switched ON and OFF, such occurrence has in its narrowness a sufficient pattern to equate to a fairly steady load. Therefore, the base load is by definition a non-sheddable load. If control of the base load is not possible, the base load affects by its presence the control of the sheddable loads, since it accounts for a portion of the KWH consumed at any given time. Typical of the base load are the lighting and heating loads, and also certain groups of motors and equipment.

An inhibited load is defined as a load which will be permitted to be switched ON during the first minute of any demand period but will be switched OFF after a certain duration has elapsed and will be inhibited from being switched on again until after the next demand period has begun. For these loads the control system needs to know the duration of ON time from the beginning of a given demand period, and at a given instant whether the load is available for use or not. If the load is available, it will be qualified as permissive.

The sheddable loads are by definition the loads which may become available on a priority basis to be switched ON, or OFF, by the control system. This is a general quality of the loads which are not base loads provided they have not a "non-controllable" status. Thus, the constraints of the present industrial plant may limit such "sheddability."

Selection and control of the loads within such constraints are achieved in order to maximize the utilization of the power supplied and minimize the cost of the energy. Heretofore, a sheddable load essentially is a load which can be switched ON or OFF during a certain demand period without affecting the operation of the plant.

An important limitation in the control of an interruptible load is the ON time and the OFF time. It is not advisable to start up a load too often, for instance, for a motor this may have a damaging effect on the windings. Also, electrical surges caused by starting are costly. It might also be economically desirable not to leave an equipment OFF during an excessive time interval. When an excessive OFF time exists, such equipment must be switched ON and and another alternative has to be sought if the shedding of some load is the control action required at that time. The ratio between ON time and OFF time may also introduce a limitation, requiring to keep ON a load.

One important consideration in a power demand control system operation is that while sheddable loads may be available for switching, it is possible to spread the ON times and OFF times within a given demand period and between demand periods in order to spread wear.

A last category of load is the critical load. These are loads which are ON and OFF under external requirements at the plant. For instance, the air conditioners and the compressors follow local conditions. Local control might override action by the control system. Switching ON or OFF of such loads, although required by the demand control system, could be ineffective since the running time for such a load is not known in advance. For this type of load switching ON/OFF is constantly monitored.

Referring to FIG. 10, the loads are controlled by a contact output unit 5, which is part of a process control computer system 6. The contact output unit 5 does operate a plurality of load contact outputs 7, each of which closes the energizing circuit of a corresponding relay 8 to actuate the switching element 9 of a load. Such switching element may be the starter of an electrical motor, the plunger of the valve of a compressor, etc.

When a load is in the switched ON condition, a corresponding status contact interrupt 10 is closed as shown on FIG. 10, with the contacts being arranged so as to correspond to the loads. There is shown in FIG. 10 two such groups of contacts with one group being associated with a diode 11 and one scan contact output CO1, and the other group being associated with a diode 12 and another scan contact output CO2. Respective diodes 13 are connected in circuit with corresponding status contact interrupts 10 to establish a circuit from a 48V source 20 provided by the computer system, to ground with the associated diode, 11 or 12. As shown on FIG. 10, concurrent closing of one scan contact output such as CO2 and one particular status contact interrupt 10, such as shown on the Figure, permits identification by the interrupt unit 14 of the status of the particular contact as being one of Group 2 (CO2 on the Figure).

In order to control the power demand by shedding or adding loads, the control system 1 is responsive to the power consumption continuously recorded by the meter 15 of the power supply company. The process control computer receives over a line 16 the KWH pulse which as a Δt characterizes the consumption at any particular instant within the demand period. The power supply company also provides a clock 17 which determines the beginning and the end of each demand period. In the instant case it is assumed that each such demand period lasts 15 minutes. For each turn of the disc of the meter 15 there is a pulse generated which will be hereinafter called "KWH pulse." The succession of these pulses represents on a time scale the power consumed for one turn of the disc. The process control computer system 6 through the interrupt unit 14 assesses the status of the status contact interrupts 10, and more generally monitors all the input data fed into the computer system regarding the individual loads in the plant with their constraints, effectuates calculations, makes decisions which are converted, after each of the above-mentioned KWH pulses, into whatever load control action is necessary through the controlled operation of the relays 8.

Included as part of the control system 1, is the process control computer system 6. This computer system can be a digital computer system, such as a Prodac 2000 (P2000) sold by Westinghouse Electric Corporation. A descriptive book entitled "Prodac 2000 Computers Systems Reference Manual" has been published in 1970 by Westinghouse Electric Corporation and made available for the purpose of describing in greater detail this computer system and its operation. The input systems, associated with the computer processor are well known and include a conventional contact closure input system to effectuate scanning of the contacts or other signals representing the status of the equipment. Also, operator controlled and other information input devices and systems are provided such as the teletypewriter 19 shown in FIG. 10. The contact closure output system is also conventional and part of the Prodac 2000 general purpose digital computer system sold.

Although FIG. 10 shows electrical loads which are sheddable or which can be picked up by the demand control system, it should be understood that switching of an electrical load is not the only control action within the scope of the present invention. If it is found not necessary or desirable to limit the demand by switching the actual electrical load ON or OFF in every case, the same result can be obtained by other alternatives. For instance, fan loads can be reduced to some 20% of normal by closing the inlet vanes or damper by means of a servomotor, rather than switching OFF the motor. This operation could be performed relatively frequently and for short periods (for example towards the end of a demand period as a fine trim), whereas there is a limited number of starts per hour allowed for larger motors. When the load involves eddy current couplings or pneumatic clutches, the mechanical loads can be disconnected from their motors. With air compressors having inlet valves, these may be held open by the pressure control equipment when the pressure is high. The control of compressors to maintain demand below the desired level would operate in parallel with the pressure control system with the same goal. These alternatives avoid increasing the cost of maintenance of plant equipment.

The computer system used in the control system according to the invention includes both Hardware and Software. For instance, the interrupt unit 14 is associated with an interrupt handler (50 in FIG. 12). Software is being used as a convenient means of quickly and efficiently performing operations as required in monitoring data, doing calculations, making decisions and translating treatment of information into control action within the short time intervals determined by the recurrent transmission of KWH pulses from the power supply company meter 15.

Figure 12:
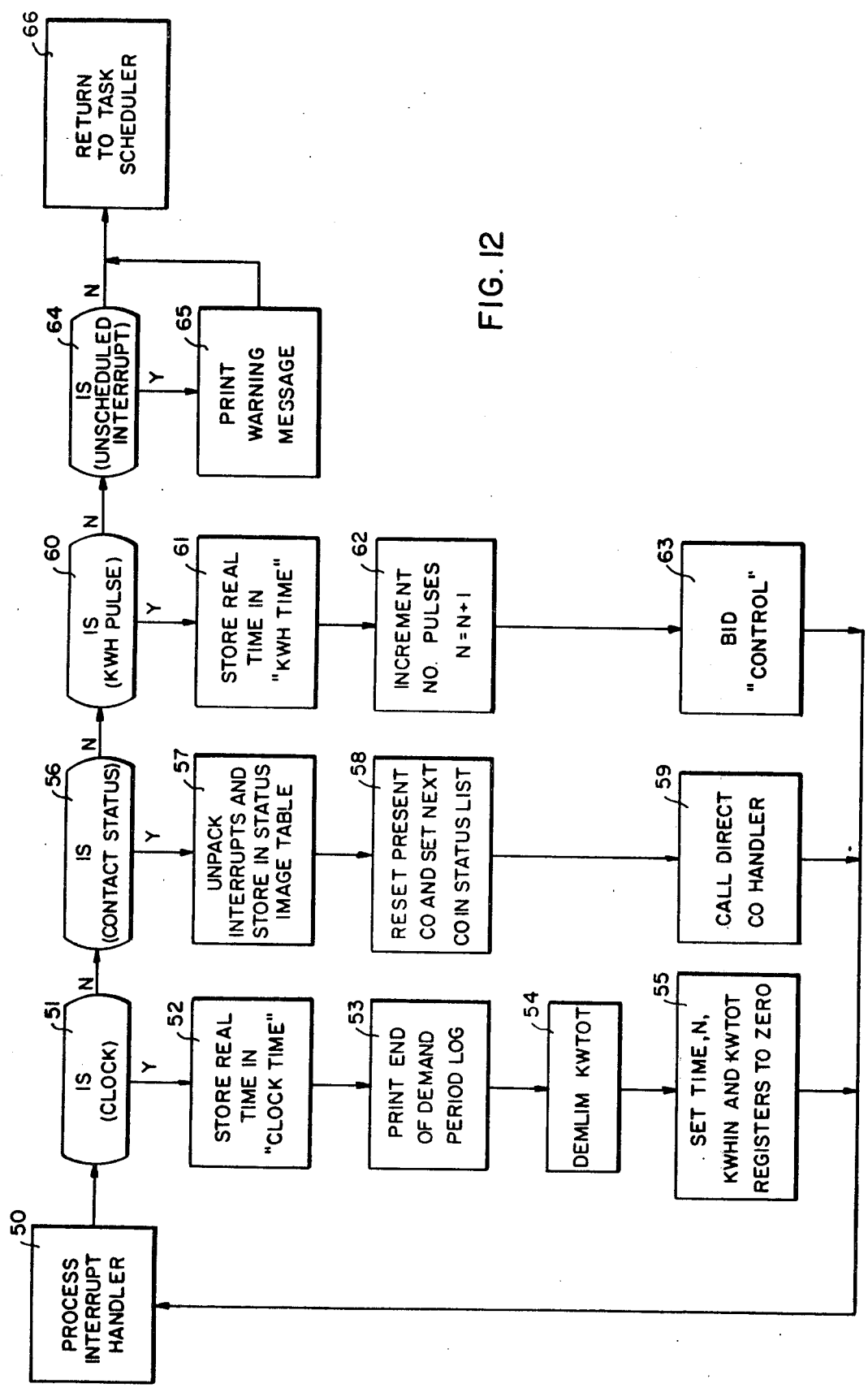
FIG. 12 is a flow chart explaining the operation of the Process Interrupt Handler which is part of a control system for power demand control in the processor.

It is observed that the inputs consist of interrupts which are successively handled by the process interrupt handler (see FIG. 12). One interrupt will receive the 48V DC pulse generated by the external clock and is used to reset the associated registers in the computer when it is received. Another interrupt will receive a train of 48V DC pulses transmitted by the meter 15, each pulse representing KWH (or KVAH) consumed. Another interrupt could be reserved for a second KWH meter if needed. Three other interrupts (the scan contact interrupts 10 of FIG. 10) will receive a status which corresponds to the status of one load contact in the plant and belongs to one group of three associated with one scan contact output (CO1, CO2 on FIG. 10).

The normal operator interface with the system will be via a teletypewriter 19. This device will also provide a log of system performance together with any other messages that may be required. Via the typewriter keyboard the operator will also be able to change the values of various constants relating to the system as a whole or to individual items of equipment. The time and date and on-peak and off-peak demand levels can also be changed using the same keyboard.

Having considered the Hardware aspect of the control system according to the invention, consideration will now be given to the software components of the computer system referring in particular to the flow charts of FIGS. 12, 13A, 13B and 13C. Referring to FIG. 12, the operation of the interrupt handler 50 of the computer system is described. This program will receive T (at step 51) an interrupt from the clock at the beginning of each demand period together with a KWH pulse (at step 60) from the KWH (or KVAH) meter 15 for each revolution of the disc.

In response to a clock pulse, the decision at step 51 is a yes, and the data are transferred to a buffer. These data include time (step 52) the demand limit desired at the end of the demand period (coded as DEMLIN) which is set in the total kilowatt register (KWTOT). At step 53, the program puts data to be printed out for the preceding demand period. The next step (55) is to clear all registers in which accumulated values are stored including time into period and KWH during the period (time, number of pulses N, KWHIN, and KWHTOT registers). Prorated values of time and KWH are stored in those registers when the KWH pulse does not coincide with the clock pulse. The chain returns to the process interrupt handler 50.

If the interrupt relates to a contact status, as seen at step 56, the interrupt is stored at step 51 at the proper location to provide a status image of the array of contact interrupts 10 (FIG. 10). The present contact output is reset and the next contact output is set in the status list (at step 58). At step 59 the contact output handler which corresponds to the contact output unit 5 (FIG. 10) is bid, and the chain returns to the process interrupt handler 50. If the interrupt is the KWH pulse from the meter, as seen as step 60, this data is stored as real time in a "KWH TIME" register. For each return of the disc of the meter, e.g., for equal increments of energy, one KWH pulse is received. The count is effected at step 62 (N = N + 1), and whenever required, there is a bid for control at step 63. This chain returns also to the process interrupt handler 50. Besides the preceding interrupts which directly determine operation of the control system, there may be other interrupts received, as seen at step 64. Such "unscheduled" interrupts cause at step 65 the printing of a warning message, and there is a return to the task scheduler of the computer system.

Figure 13A:
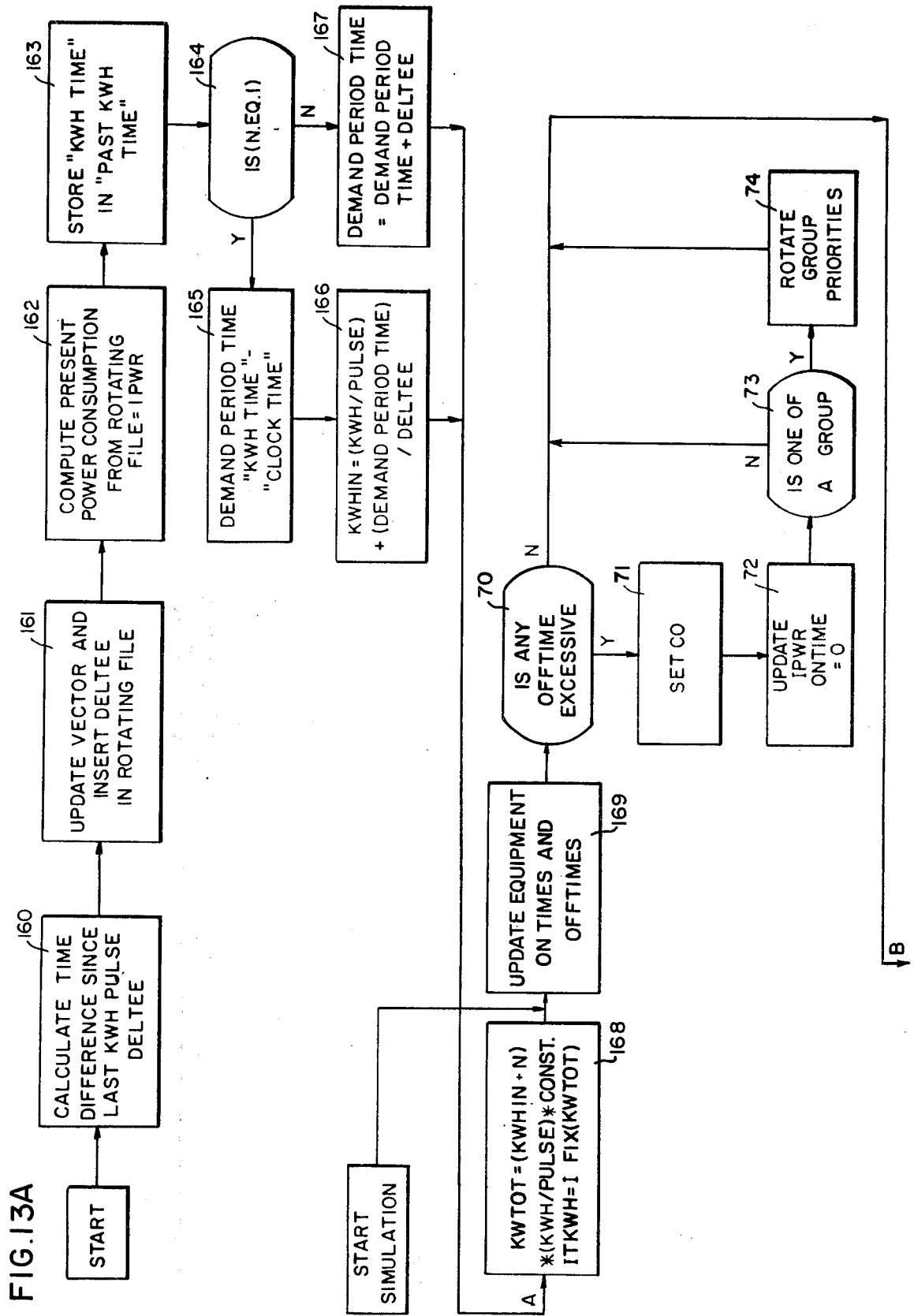
FIGS. 13A, 13B and 13C show an illustrative logic flow chart of a program for power demand control.
Figure 13B:
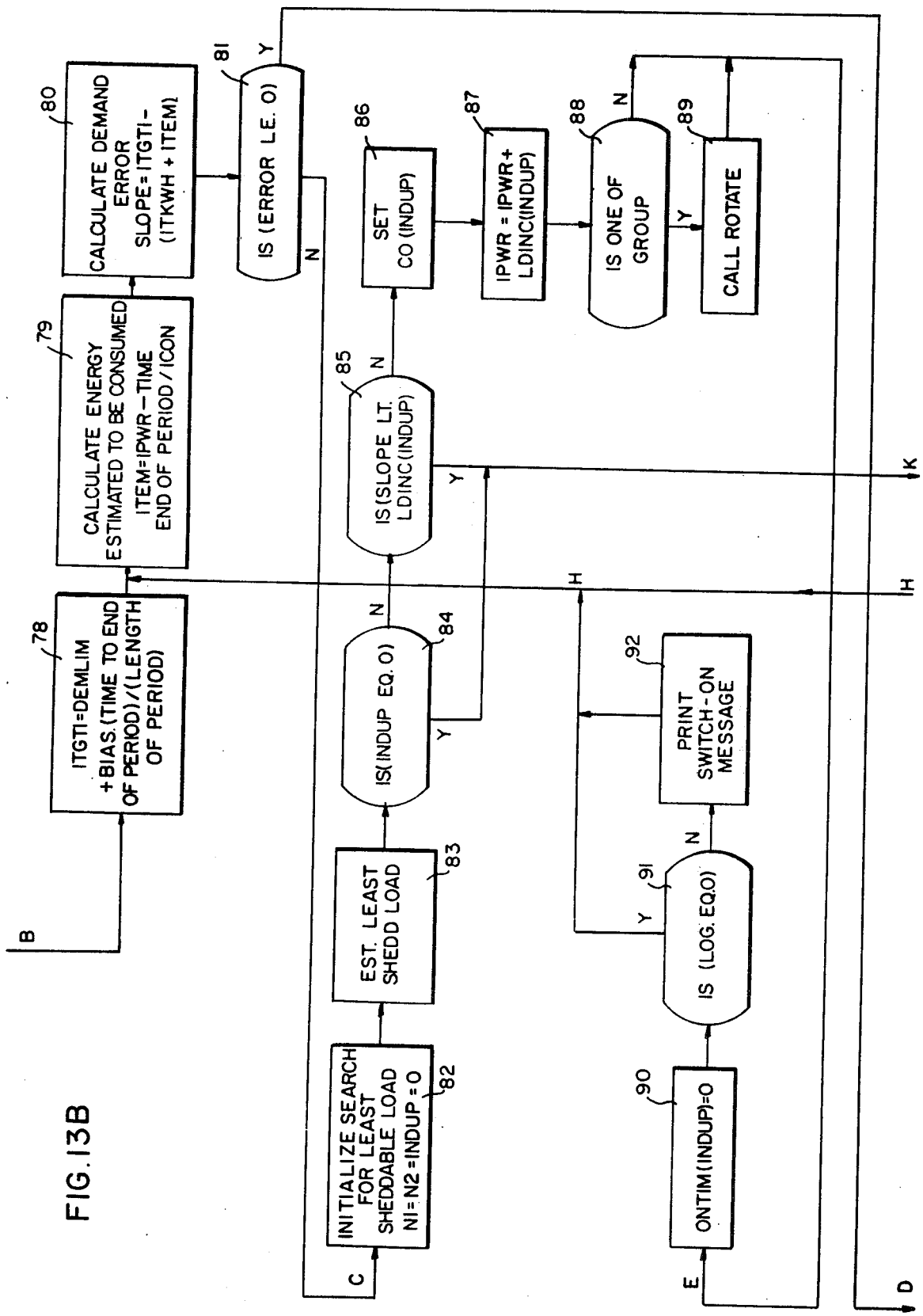
Figure 13C:
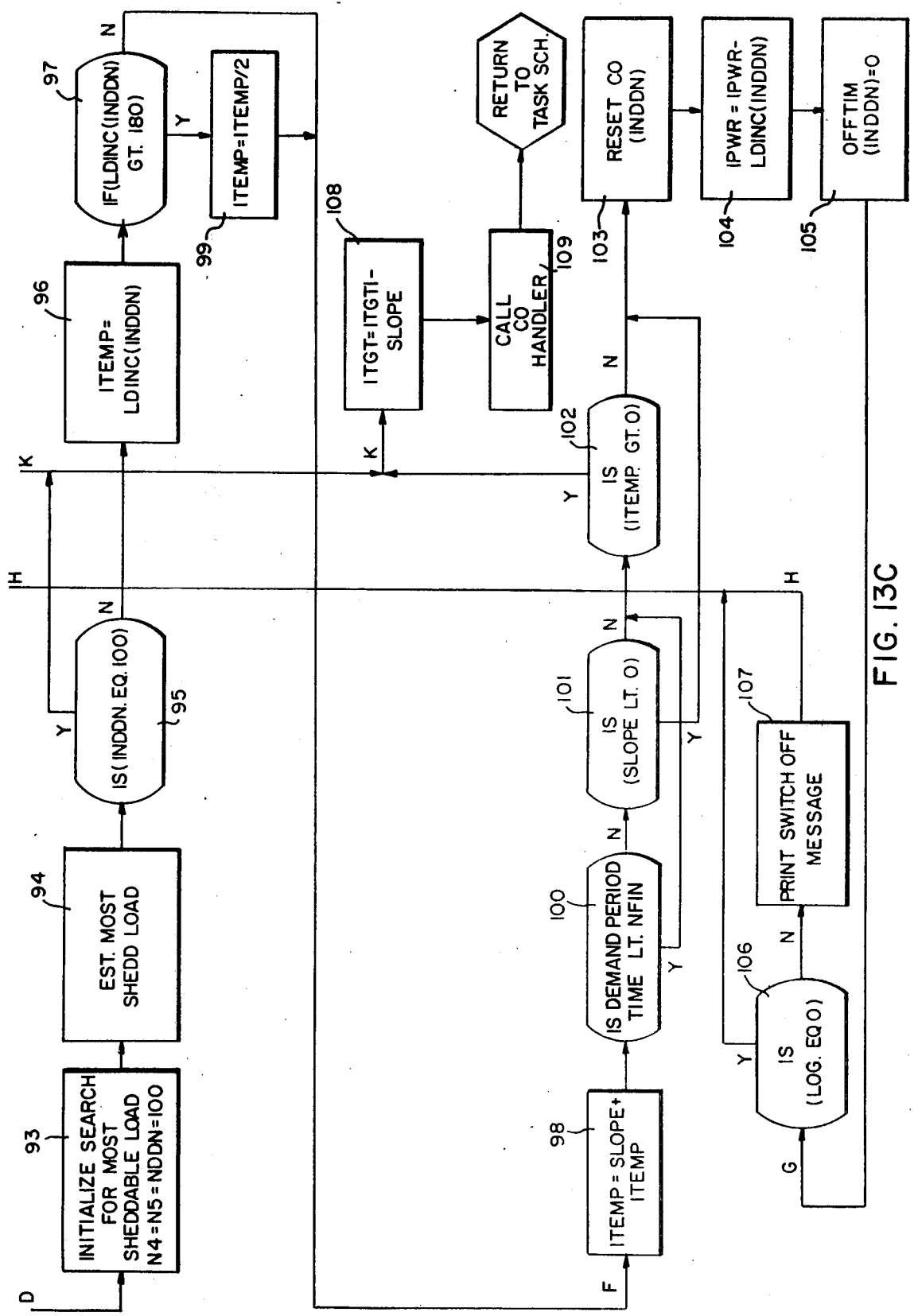

FIGS. 13A, 13B, 13C show a flow chart of the main control program, which is provided to explain the operation of the control system according to the present invention.

When control starts, "DELTEE" e.g., the Δt between two successive KWH pulse, is determined by difference. This is step 160. Then a rotating file is updated by adding the last of three successive vectors corresponding to three successive times $t_1$, $t_2$, $t_3$ ($t_3$ being for the latest Δt at step 161). At step 162, the present power consumption (IPWR) is computed from the rotating file, and from the present status IPWR is translated at step 163 into the "Past KWH TIME" register. At step 162 the present power consumed is calculated by averaging for three successive points on the trajectory corresponding to times $t_1$, $t_2$ and $t_3$. To this effect an exponential filter is used such as:

$$P_t = \left[ a \left( a\frac{k}{t_1} + (1-a)\frac{k}{t_2} \right) + (1-a)\frac{k}{t_3} \right] \quad (7)$$

or $$P_t = k \left[ a \left( \frac{a}{t_1} + \frac{1-a}{t_2} \right) + \frac{1-a}{t_3} \right] \quad (8)$$

where $0.1 < a < 0.4$ and $t_1$ is in hours and k — KWH/pulse.

It is recalled here that while each KWH pulse is received for the same increament of energy (one turn of the disc of the KWH meter), the "DELTEE" represents the power consumed within the period. The first is obtained by integrating the DELTEES corresponding to all KWH pulses received during the period. The energy consumed is equal to the number of pulses multiplied by the meter factor (KWH/pulse). The decision at step 164 (since N is normally greater than 1) is to go to step 167. However, the decision at step 164 is to go to 167 where the demand period time is found to be the sum of the Δt's in the period.

The DELTEEE corresponding to the first pulse after the clock pulse (N=1) belongs in part to the last demand period and only in part tot he new demand period. In such case, the decision at 164 is to go through steps 165 and 166 which provide a prorated value of the KWHIN in proportion to the fraction of DELTEE pertaining to the new demand period. Accordingly, step 165 provides the time difference between KWH Time and clock time, and at step 166 the prorated value KWHIN is computed.

Looking to A on FIG. 13A, the next step is to compute KWTOT, e.g., the energy consumed during the present demand period until the particular iteration, converted to equivalent power at the end of the period. KWTOT is equal to N (number of pulses) *KWH/pulse *Constant plus the fraction prorated at step 66, if there is one, e.g., KWHIN. Since computation is done with a floating point for increased accuracy, conversion to integer is effected as indicated by ITKWH = IFIX (KWTOT), see (168).

Then, at step 169 the system looks at the status of the ON times and OFF times of the loads, while adding the Δt (DELTEE) and it is determined at step 70 whether any load exceeds the OFF time assigned to it. In such a case, a decision is made at 70 to set the contact output to switch the particular load ON (step 71) thereby not to violate the constraint. Since the load has been switched ON, the ON time of this particular load is set to zero (step 72). Also, the energy estimated to be consumed in the overall industrial load system (IPWR) must be updated in order to take into account the load so picked up. However, if the load exceeding its OFF time belongs to a class, or priority including several other loads in order to reduce wear, all the loads of the same class, or priority, are rotated. Rotation is effected at step 74.

The next decision is, following B, at step 78. The target is a pseudo-target initially at A as defined by BIAS at the beginning of the period (see FIG. 8), as opposed to the desired Demand Limit (DEMLIM). The initial BIAS is reduced at each iteration until the end of the period. For instance, as shown in FIG. 8, during each time interval $(t_1-t_2), (t_3-t_4) \ldots (t_{(n-1)}-t_{15})$ the new pseudo-target is obtained by an effective bias due to a reduction of the initial BIAS by a ratio between the time left in the period and the duration of the period, namely 15 minutes. This amounts to a displacement of the target for each point on the trajectory. At step 78, $ITGT_1$ (the ordinate of the pseudo-target) is equal to DEMLIM + BIAS/(TIME TO END OF PERIOD)/(LENGTH OF PERIOD). At steps 79 and 80 the demand error is calculated. ITGTI represents the ordinate of the target. The ordinate of N (see FIG. 11) is ITKWH obtained at step 168. The ordinate of W is ITKWH + ITEM (e.g., WN). Therefore, the error due to W being too low, or too high, relative to the target is Slope = IGTI − (ITKWH + ITEM). First, at step 79 ITEM is calculated, using data obtained at step 162 (IPWR = present power consumption), and computing the second term in equation (3), e.g., $P_t(T_{max} - t)$. Knowing ITKWH and ITEM, the demand error is calculated at step 80. Then the sign of the Y or N at 81 will tell whether the projected point W lies above or below the target. If it is above, the error is negative and loads have to be switched OFF. The flow chart goes to D. If point W lies below the error is positive and loads must be switched ON. The flow chart goes to C.

First, the situation when the error is positive will be considered by taking the flow chart from C on, in order to find (1) whether there is a load to be switched ON, (2) whether a selected load can be switched ON by step 86.

The computer system then first looks for a load. Step 82 initializes a search for the least sheddable load.

In the table of priorities, the loads are classified from the least sheddable to the most sheddable (which can be understood as from the first to be switched ON to the last to be switched ON). In other words, the search goes from one end of the table when the search is to switch ON a load, and from the opposite end if the search is to switch OFF a load. (The last situation would be at D on the flow chart).

As a general consideration at this point (valid also for OFF switching at D) in a table can be stored or reserved in memory the following characteristics associated with each item of equipment to be of the switchable load type:

Equipment Identity No.
Power Consumed When Starting
Starting Period
Power Conssumed When Running
Group Priority
Subgroup Priority
Maximum Allowable Off Time
Minimum On/Off Time Ratio
Minimum Time Between Starts
Availability For Use By The Demand Control System
Address of Associated Contact Output
Amount of Time 'Off' Since Being Switched Off — Updated Each Sec., or After
Amount of Time On Since Being Switched On Each KWH Pulse.

The group priority is assigned by the user, the most sheddable loads being low numbers. Priority, or group, numbers increase with the importance of the load to the overall plant operation. The programs associated with this table will be called immediately after the switching decision subroutine, or once per second, to effect: a search through the table to determine the identity of the next load to be switched and the power difference this will make. In the case of large starting currents, a check can be made to see whether starting this motor will cause the maximum demand to be exceeded. If so, the next motor in the sequence will be selected. Similarly, it can be presumed that if the sum of OFF plus ON time is less than the minimum between starts, another unit will be selected for switching on. In the case of large loads not directly controlled by the computer but for which the computer provides a permissive contact, a check will be made to determine whether the maximum time into the period has not been exceeded and close or open this contact accordingly (see Step 70 on FIG. 13A.) If loads have imposed a maximum off time and a minimum on/off time ratio, the computer system would indicate a program to (1) switch that load ON regardless whenever the off time has exceeded the maximum allowable off time; (2) prevent the load from being switched OFF unless the ON/OFF time ratio is greater than the minimum allowed.

Figure 5:
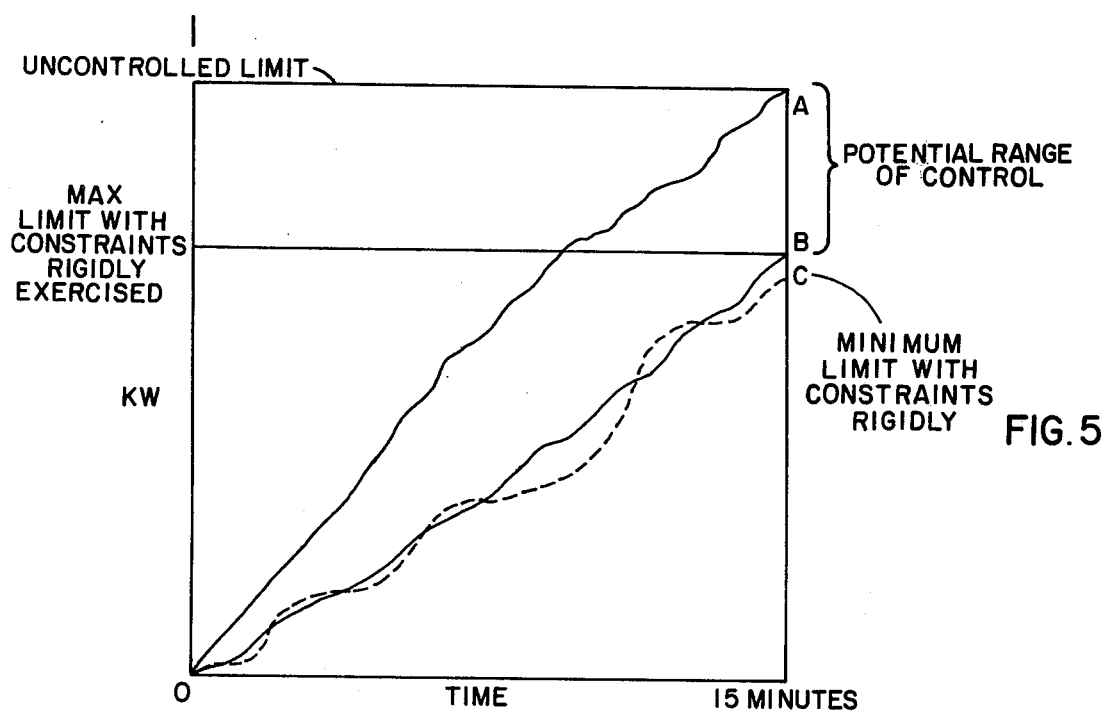
FIG. 5 shows with curves the potential range of demand control.

Returning to C on the flow chart (FIG. 13B), step 82 provides for indexation of the priority order ($N_1$) and of the subpriority order ($N_2$) for a load to be switched ON (INDUP). At step 83 the search is established accordingly. If the search has not provided at least sheddable load, the decision at step 84 is to go to K, e.g., a no control drain leading to a bid for the CO handler at 109. At step 109, the projection W on the final ordinate of the tangent from the point M on the trajectory (see FIG. 11) is determined as ITGT by the difference between the target and the error. Such information can be conveniently logged for the following reason. ITGT = Ordinate of target (C, if in the second field of control) − error (CW). This is the way ITGT is determined at step 108. But ITGT is also equal to: WN + ordinate of N (See FIG. 5). Since WN = ITEM and ordinate of N = ITKWH, both known by steps 168 and 79, then ITGT is known from previous computations. However, when late in the demand period ITEM becomes very small, therefore a log of ITGT provides a value which tends to be ITKWH equal to the final demand at the end of the demand period.

At step 109 the CO handler of the computer is called upon to check the contact outputs and there is a return to the task scheduler of the computer system.

Figure 11:
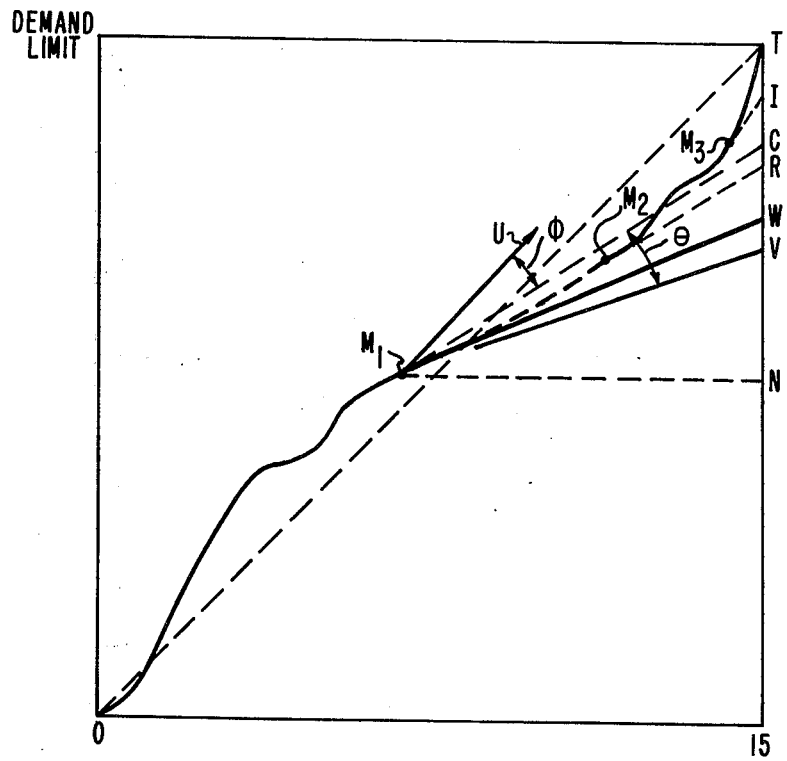
FIG. 11 illustrates a particular strategy of control.

Still referring to FIG. 11, if, however, a load to be switched ON has been found (NO at 85), (INDUP) the deadband is put into effect at step 85. If the deadband (LDINC) includes vector MW, then no control is effected (YES at 85) and the flow chart goes again to K (again a log of ITGT and a bid for the CO handler). However, if there is a NO at 85 then MW is outside the deadband (LDINC), control is possible and action is bid at step 86. At step 87 the new present power consumed IPWR is calculated by including the added power LDINC and due rotation is effected within a group of loads at step 89 if the load is one of a group.

Having called for the load to be ON, the ON time (ONTIM) for the particular load (or for the rotated group of loads if steps 88, 89 are followed) is initialized at 90 (E), while at step 91 a decision is made to print the "Switch-On" message (92) if the control operation requires it.

Considering now the decision at 85 to switch a selected load ON (if N) or not to switch (if Y), the error CW (FIG. 5 for second field of control) is compared with the increase of power LDINC expected. Control will occur only if LDINC is less than the error. If the selected load can be switched (85), the control action is determined at step 86 and the increased amount of power is accounted for in the new IPWR (step 87). Having called for the load to be ON, the ON time (ONTIM) for the particular load (or for the rotated group of loads if steps 88, 89 are followed) is initialized at 90 (E), while at step 91 a decision is made to print the "switch-ON" message (92) if the control operation requires it.

When the demand error (81) is negative a load must be switched OFF because ITGT is above the target. In such case, the flow chart goes to D (FIG. 4C). Steps 93 and 94 correspond to the steps 82, 83 encountered at C for the positive demand error. The search here is for the most sheddable load, thus from the opposite end of the table of priorities and subpriorities ($N_4$, $N_5$) as opposed to steps 82, 83 for ON switching. When no load to be switched OFF is found, the program indicates 100 as a flag. If this is the case, the flow chart goes to K, and no control is exercised as previously indicated with respect to steps 108, 109. If there is such a load (INDDN), the decision (95, N) is to test the relation of LDINC (the correlative decrease of power if the particular load were effectively switched OFF) to ITEMP which determines the deadband. Two situations happen at this stage depending upon whether the load exceeds 180 KW (Y) or not (N) and the decision is made at 97. If it is a Y, ITEMP is made half of what it is at step 96. In other words, 96 can be read as making the deadband ITEMP = LDINC and 99 as making the deadband ITEMP = ½ LDINC. Assuming 97 leads to N, then ITEMP is made equal to LDINC. This means that at step 98 the slope (CW if in the second field) which is negative is in fact subtracted from LDINC. This difference is a residual error sign of which (in the second field 100 goes to 102) is checked for decision at 102 to control 103 or not 108 switching of the particular load. Again, if the vector or W is within the deadband (between MV and MC), there will be no control. If MW is outside the deadband, then the load will be switched OFF. If control is in the third field 101 then the system merely looks to the error (negative here) to switch (Y) or not the loads OFF.

Once a load is shed (at step 103) the present power IWPR is updated (104). At step 105, the OFFTIM (computed off-time of the load) is updated at each iteration. A decision is made thereafter to log the information (step 106) and to print a switch-OFF message (step 107). After each control operation (shedding or pickup), the energy estimated to be consumed is estimated (at step 79) and the demand error is again calculated in order to establish whether a new load should be switched ON (at C) or OFF (at D).

It should be observed here that there is a difference between (1) the switching ON of a load which has been OFF for an excessive OFF time, such as operated by the system at 70 and 71 (FIG. 13A) and (2) the switching ON of a selected load such as at 86 on FIG. 13B. When there has been an excessive OFF time, the system indeed provides for the switching ON of the load. However, such switching is not really a "controlled" switching in the sense that a) there is no selection made of the load, no prediction made of the KWH and no decision is done to switch under predetermined conditions which suppose alternative situations; and b) the additional load created at 70 and 71 might go against the overall objective to limit the demand. In contrast, when switching ON a load at 86, a selection, 82, 83, is made and the decision to switch is based on an anticipation 80 of an error. Therefore, when referring to switching such as at 70, e.g., under the constraints assigned to the load, the load should be considered as in a "non-controllable" status.

A last remark can be made regarding the overall operations of the control system. Since loads in a non-controllable status spontaneously are switched ON when their OFF time has been exceeded when a flag 100 has appeared to indicate that no load is available to be shed, the system will be itself become effective for control since more loads will become available at the next iterations.

DESCRIPTION OF THE STEPS OF THE METHOD ACCORDING TO THE INVENTION BY REFERENCE TO THE OPERATIVE CONDITIONS OF THE CONTROL SYSTEM OF U.S. PAT. NO. 3,872,286

As shown in copending application Ser. No. 791,827 filed Apr. 28, 1977, of R. Q. Fox, D. Sigut and J. H. McWhirter, it has been proposed to substitute for a fixed demand limit during a billing period (one month time) a target moving upward from demand period to demand period (15 minutes) according to the actual demand required by the production facility and as recorded during a previous demand period, whenever the actual demand exceeds the previously assigned target.

The present invention proposes to start with a high target and make target adjustments downward, during a demand period in order to maximize the work which can be done during a demand period.

Figure 14:
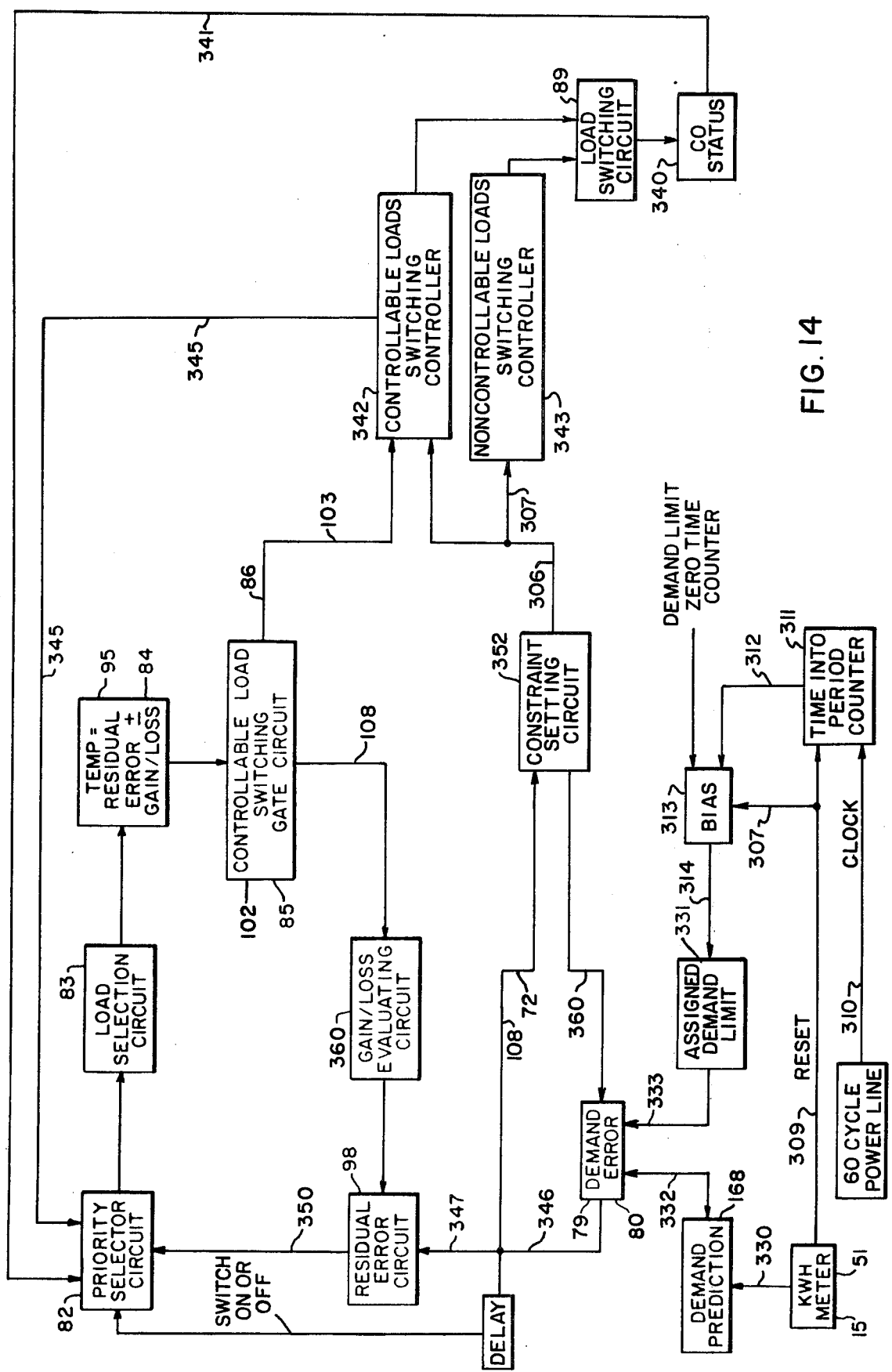
FIG. 14 is a diagram illustrating the operative steps of the control method according to the present invention, in the context of a power demand control system described in U.S. Pat. No. 3,872,286 of Putman.

Referring to FIG. 14, a diagrammatic representation of the organization of the control system according to the present invention is provided in the context of the power demand control system of U.S. Pat. No. 2,872,286. The main functions used in the preferred embodiment of the invention are indicated on FIG. 14 and identified by blocks. All blocks which have already been explained by reference to FIGS. 12 and 13A-13C have been referred to by the same reference numerals wherever found in those early figures.

The system is assigned a target to be met at the end of the 15 minute period. However, in accordance with the present invention, a pseudo-target is established at the start of the period on line 308 to a bias circuit 313 controlling, via line 314, the assignment demand limit circuit 331 used for error determination and sheddable load selection under the priority table during the 15 minute period.

A time into the period counter 311 defines elementary time intervals between the start and the termination of the period under control, via line 310, of the clock in the KWH meter 15, 51. At the end of the period, counter 311 is reset by line 309 by the subsequent demand period.

Each elementary time interval on line 312 defines a stepwise increase of the bias action of circuit 313 on the reference demand limit of line 308. As a result, during the demand period, the effective assigned demand limit from circuit 331 is reduced by steps from the initial pseudo-target defined by the reference on line 308 down to the assigned target through intermediary pseudo-targets. Referring to FIG. 8, at times $t_0$, $t_1$, $t_2$, $t_3$, etc ... $t_{15}$ defined by counter 311, the bias circuit establishes successive anticipated demands FA, FB, FC, FD ... FT, where A is a pseudo-target defined by line 308, and T is the actual target defined by the fully unbiased input on line 314 to circuit 331 at instant $t_{(n-1)}$ anticipated at the end of the period. Preferably, such anticipated demands (A–D) are selected in relation to the particular load profile in the plant. Accordingly, A would represent, for instance, the anticipated demand at the end of the period when all sheddable loads are ON and be comparable to AB of FIG. 4, while T at the end of the period would be similar to BC of FIG. 4; thus, minimizing at both ends the consumption for a given target (T in FIG. 8, C in FIG. 4). The invention provides intermediary targets (B, C, D in FIG. 8) which maximize comsumption throughout the demand period while keeping within reach of the intended target (T) at the end of the period. In the same spirit, since at each operative point, $M_1$, $M_2$, $M_3$, $M_4$ (FIG. 8) the instantaneous power indication derived from the KWH meter 15, 51 is an indication of the tangent at each point on the KWH curve, the value of the reference signal on line 108 may be derived in response to the KWH meter from the demand anticipated by the system from the loads. Thus at time $t_0$, such value of the demand converted in anticipated KWH is being used for the duration of the elementary trip interval $t_0$–$t_1$, as a pseudo-target. When the counter reaches $t_1$, due to the reduced bias in 313 caused by the time into the period counter 311 via line 312, a new value corresponding to the B pseudo-target used to control the load selective process from $t_1$ to $t_2$, and so on until $t_{15}$ is reached. There could be another mode of assigning to the assigned demand limit circuit 331 successive pseudo-targets at chosen times $t_0$, $t_1$, $t_2$, $t_3$ and $t_4$. For instance, it could be possible to store successive values representing the successive pseudo-targets. Again, the system is reset at time $t_{15}$, for the next demand period.

The following is a program listing of an actual operation of the control system according to the invention:

SAMPLE LISTING

TIME DEPENDENT DEMAND CONTROL

```
C                              TIME DEPENDENT DEMAND CONTROL
C                              THIS ROUTINE RUNS EVERY
C                              10 SECONDS
C                              IS THERE A MAXIMUM WORK OPTION
      IF (I:WORK. EQ. O) GO TO 999
C                              YES, MODIFY THE PSEUDO
C                              DEMAND LIMIT
      RLTIM=LTIM
      PDEMLIN=(PSEUDMAX*(RLTIM-TIME)
      /RLTIM)+DEMLIN
      CALL EXIT
      END
```

DEFINITIONS OF THE TERMS OF THE LISTING

| NAME | TYPE | FUNCTION |
|---|---|---|
| I:WORK | INTEGER | MAXIMUM WORK OPTION FLAG 1 = SELECTED |
| LTIM | INTEGER | DEMAND PERIOD LENGTH |
| RLTIM | REAL | SAME AS LTIM |
| PDEMLIM | REAL | TRUE DEMAND LIMIT |
| PSEUDMAX | REAL | BIAS ABOVE TRUE DEMAND LIMIT |
| TIME | REAL | TIME INTO PERIOD |

I claim:

1. A method of controlling a plurality of interruptible loads in an industrial plant supplied with power from a utility power company in order to hold the demand at the end of a demand period to a predetermined demand limit; comprising the steps of:
   establishing at successive time intervals within the demand period respective pseudo-demand-limits to be reached at the end of the demand period;
   deriving at selected instant during the demand period an indication of power consumption of said loads;
   predicting in relation to the indication received at a corresponding one of said instants a demand at the end of the demand period;
   comparing the predicted demand and the pseudo-limit for a corresponding one of said successive time intervals for providing a demand error relative to such pseudo-demand-limit;
   selecting a suitable amount of power with said loads to minimize said demand error with said corresponding time interval;
   the said comparing step being performed following a preceding one of said time intervals for providing a residual demand error relative to said predetermined demand limit; and
   said selecting step being accomplished so as to minimize said residual error before the end of the demand period.

* * * * *